United States Patent
Nishioka et al.

(10) Patent No.: US 8,487,983 B2
(45) Date of Patent: Jul. 16, 2013

(54) VIEWING AREA ADJUSTING DEVICE, VIDEO PROCESSING DEVICE, AND VIEWING AREA ADJUSTING METHOD BASED ON NUMBER OF VIEWERS

(75) Inventors: Tatsuhiro Nishioka, Kawasaki (JP); Nobuyuki Ikeda, Tokyo (JP); Hiroshi Fujimoto, Kawasaki (JP); Toshihiro Morohoshi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/404,803

(22) Filed: Feb. 24, 2012

(65) Prior Publication Data

US 2013/0050418 A1 Feb. 28, 2013

(30) Foreign Application Priority Data

Aug. 31, 2011 (JP) ................................. 2011-189598

(51) Int. Cl.
*H04N 13/00* (2006.01)

(52) U.S. Cl.
USPC .......................................................... 348/43

(58) Field of Classification Search
CPC ................................ H04N 13/04; H04N 13/00
USPC ................................................... 348/43, 51
See application file for complete search history.

(56) References Cited

U.S. PATENT DOCUMENTS

| | | |
|---|---|---|
| 2006/0215018 A1 | 9/2006 | Fukushima et al. |
| 2007/0058034 A1* | 3/2007 | Numazaki et al. ............... 348/51 |
| 2009/0195642 A1 | 8/2009 | Fukushima et al. |

FOREIGN PATENT DOCUMENTS

| | | |
|---|---|---|
| JP | 2002-10293 | 1/2002 |
| JP | 2002-49004 | 2/2002 |
| JP | 2006-309178 | 9/2006 |
| JP | 2007-081562 | 3/2007 |
| JP | 2009-053567 | 3/2009 |
| JP | 4521342 | 5/2010 |

OTHER PUBLICATIONS

Japanese Office Action dated Apr. 27, 2012 for Japanese Application No. 2011-189598 filed on Aug. 31, 2011.

* cited by examiner

*Primary Examiner* — Jayanti K Patel
*Assistant Examiner* — Yulin Sun
(74) *Attorney, Agent, or Firm* — Knobbe, Martens, Olson & Bear LLP (57) ABSTRACT

A viewing area adjusting device has an image pickup unit capable of shooting a forward direction of a stereoscopic video display device capable of displaying a stereoscopic video, a viewer information detector configured to detect the number of viewers and positions of the viewers by a video shot by the image pickup unit, a viewing area adjustment policy determining unit configured to select any one of a plurality of viewing area adjustment policies based on the number of viewers detected by the viewer information detector, a viewing area information computing unit configured to compute an adjustment amount for the viewing area, and a viewing area adjusting unit configured to adjust the viewing area.

11 Claims, 11 Drawing Sheets

| THE NUMBER OF VIEWERS | VIEWING AREA ADJUSTING METHOD |
|---|---|
| 0 | II / CENTER FIXATION |
| 1 | II / AUTOMATIC TRACKING |
| 2 OR MORE | II / AUTOMATIC TRACKING ON A PLURALITY OF VIEWERS |

| THE NUMBER OF VIEWERS | INPUT VIDEO | 3D METHOD / VIEWING AREA ADJUSTING METHOD |
| --- | --- | --- |
| 0 | STEREO 3D | DIRECT 3D / CENTER FIXATION |
| 0 | OTHER THAN STEREO 3D | II / CENTER FIXATION |
| 1 | STEREO 3D | DIRECT 3D / AUTOMATIC TRACKING |
| 1 | OTHER THAN STEREO 3D | II / AUTOMATIC TRACKING |
| 2 OR MORE | STEREO 3D | II / AUTOMATIC TRACKING ON A PLURALITY OF VIEWERS |
| 2 OR MORE | OTHER THAN STEREO 3D | II / AUTOMATIC TRACKING ON A PLURALITY OF VIEWERS |

| INPUT | | METHOD DEPENDING ON USER PREFERENCE | | | |
|---|---|---|---|---|---|
| THE NUMBER OF VIEWERS | INPUT VIDEO | DIRECT 3D PRIORITY | II PRIORITY | HISTOGRAM PRIORITY | MANUAL SETTING |
| 0 | STEREO 3D | DIRECT 3D / CENTER FIXATION | II / CENTER FIXATION | II / HISTOGRAM-BASED CENTER ESTIMATION | II / MANUAL |
| | OTHER THAN STEREO 3D | II / CENTER FIXATION | | | |
| 1 | STEREO 3D | II / AUTOMATIC TRACKING | II / AUTOMATIC TRACKING | II / AUTOMATIC TRACKING AND HISTOGRAM-BASED PRIORITIZING | DIRECT 3D / MANUAL |
| | OTHER THAN STEREO 3D | | | | II / MANUAL |
| 2 OR MORE | STEREO 3D | II / AUTOMATIC TRACKING ON A PLURALITY OF VIEWERS | II / AUTOMATIC TRACKING ON A PLURALITY OF VIEWERS | II / AUTOMATIC TRACKING AND HISTOGRAM-BASED PRIORITIZING | II / MANUAL |
| | OTHER THAN STEREO 3D | | | | |

FIG. 12

VIEWING AREA ADJUSTING DEVICE, VIDEO PROCESSING DEVICE, AND VIEWING AREA ADJUSTING METHOD BASED ON NUMBER OF VIEWERS

CROSS REFERENCE TO RELATED APPLICATIONS

This application is based upon and claims the benefit of priority from the prior Japanese Patent Application No. 2011-189598, filed on Aug. 31, 2011, the entire contents of which are incorporated herein by reference.

FIELD

Embodiments of the present invention relate to a viewing area adjusting device for adjusting a viewing area in which a stereoscopic video is viewable, a video processing device, and a viewing area adjusting method.

BACKGROUND

A TV capable of displaying a stereoscopic video viewable with naked eye attracts attention. However, in such a TV, there is a case where stereoscopic effect cannot be obtained in some viewing positions, and in order to obtain a sufficient stereoscopic effect, a viewer has to move to the position where the stereoscopic effect is obtained. In particular, when a plurality of viewers exist, it is extremely annoying for each viewer to move to the position where the stereoscopic effect is obtained.

Accordingly, it is assumed to adjust a viewing area for obtaining the stereoscopic effect by TV. However, it is not easy to automatically adjust the viewing area by TV since the viewer does not always stay at the same position and the number of viewer is not always fixed.

Further, video data inputted into TV may include or not include parallax data or depth information necessary for reproducing a stereoscopic video. Thus, there is a fear that a viewing area automatically adjusted without considering the type of the video data is against the viewer's intention.

Furthermore, preference of the viewer is infinite in variety, and automatic adjustment ignoring the preference of the viewer is not desirable.

DETAILED DESCRIPTION

According to one aspect of the present embodiment, a viewing area adjusting device has:

an image pickup unit capable of shooting a forward direction of a stereoscopic video display device capable of displaying a stereoscopic video;

a viewer information detector configured to detect the number of viewers and positions of the viewers by a video shot by the image pickup unit;

a viewing area adjustment policy determining unit configured to select any one of a plurality of viewing area adjustment policies each showing a policy for adjusting a viewing area where the stereoscopic video is viewable, based on the number of viewers detected by the viewer information detector;

a viewing area information computing unit configured to compute an adjustment amount for the viewing area, based on the viewing area adjustment policy selected by the viewing area adjustment policy determining unit and on the position of each viewer detected by the viewer information detector; and a viewing area adjusting unit configured to adjust the viewing area, based on the adjustment amount for the viewing area computed by the viewing area information computing unit.

Embodiments will now be explained with reference to the accompanying drawings.

(First Embodiment)

Figure 1:
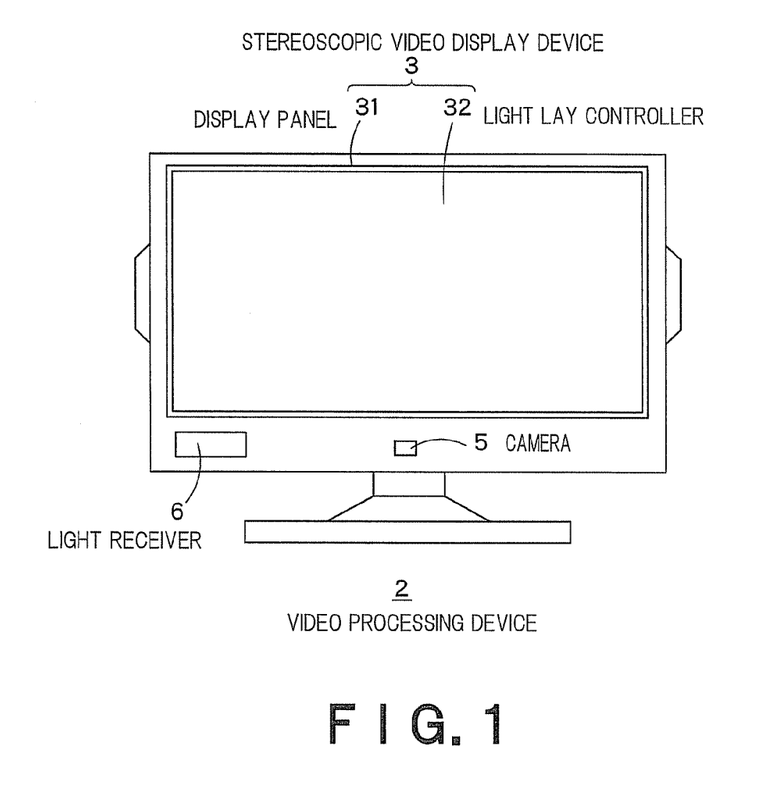
FIG. 1 is an external view of a video processing device 2 having a viewing area adjusting device 1 according to a first embodiment.
Figure 2:
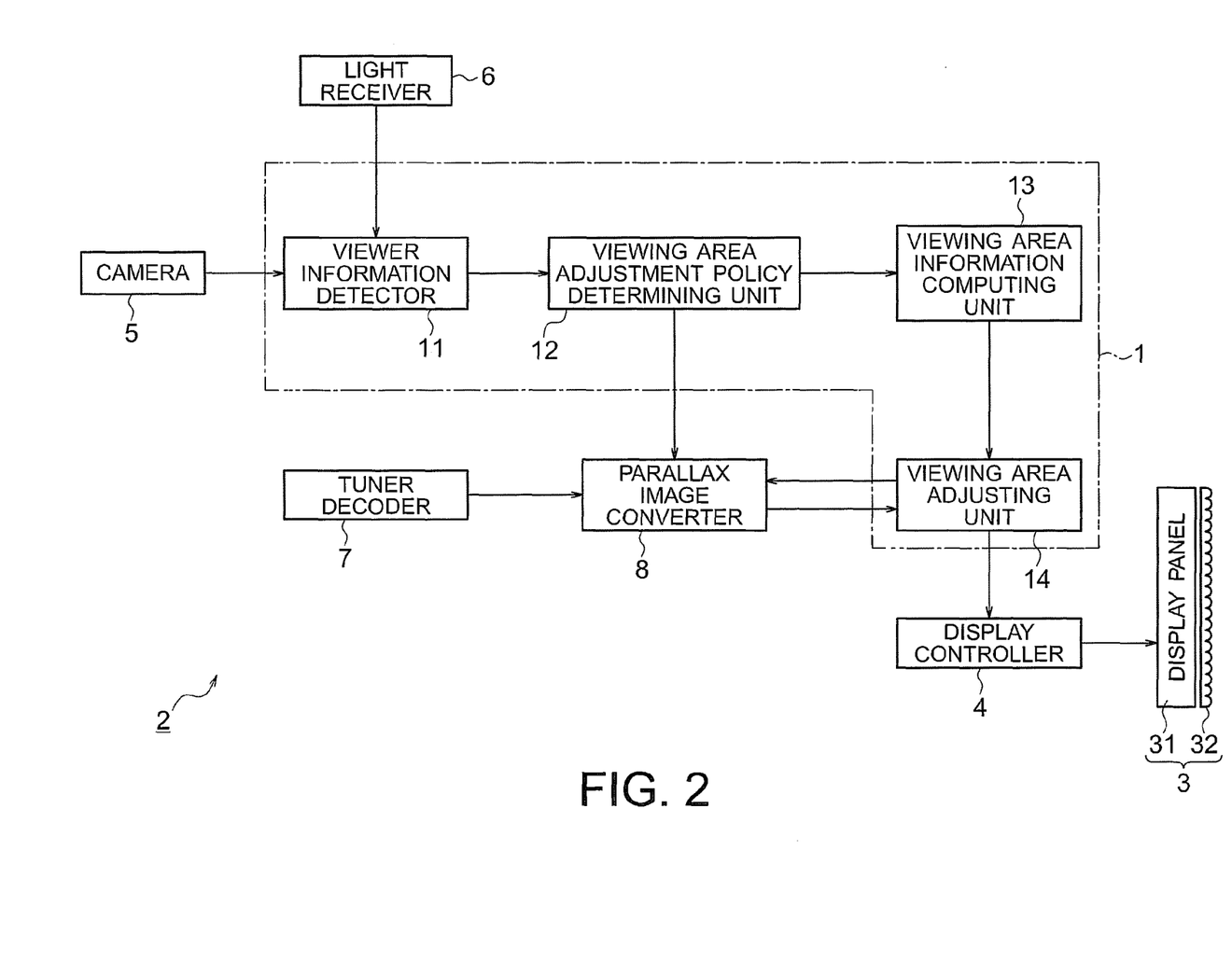
FIG. 2 is a block diagram showing an example of a schematic structure of the video processing device 2.

FIG. 1 is an external view of a video processing device 2 having a viewing area adjusting device 1 according to a first embodiment, and FIG. 2 is a block diagram showing a schematic structure thereof. As shown in these drawings, the video processing device 2 has a stereoscopic video display device 3, a display controller 4, a camera 5, a light receiver 6, a tuner decoder 7, and a parallax image converter 8.

The stereoscopic video display device 3 has a display panel 31 having pixels arranged in a matrix, and a light ray controller 32 having a plurality of exit pupils arranged to face the display panel 31 to control the light rays from each pixel. The display panel 31 can be formed as a liquid crystal panel, a plasma display panel, or an EL (Electro Luminescent) panel, for example. The light ray controller 32 is generally called a parallax barrier, and each exit pupil of the light ray controller 32 controls light rays so that different images can be seen from different angles in the same position. Concretely, a slit plate having a plurality of slits or a lenticular sheet (cylindrical lens array) is used to create only right-left parallax (horizontal parallax), and a pinhole array or a lens array is used to further create up-down parallax (vertical parallax). That is, each exit pupil is a slit of the slit plate, a cylindrical lens of the cylindrical lens array, a pinhole of the pinhole array, or a lens of the lens array serves.

Although the stereoscopic video processing device 2 according to the present embodiment has the light ray controller 32 having a plurality of exit pupils, a transmissive liquid crystal display etc. may be used as the stereoscopic video processing device 2 to electronically generate the parallax barrier and to electronically and variably control the form and position of the barrier pattern. A concrete structure of the stereoscopic video processing device 2 is not questioned as long as it is a display device capable of displaying an image for stereoscopic image display (to be explained later).

Hereinafter, explanation will be given on an example where a lenticular lens is used as the light ray controller 32. The display panel 31 is a 55-inch panel having 11520 (=1280*9) pixels in the horizontal direction and 2160 pixels in the vertical direction, for example. The display panel 31 is illuminated by a backlight device (not shown) arranged on the back side thereof. Each pixel of the display panel 31 receives light from the backlight device, and displays a parallax image by transmitting light having a brightness corresponding to a parallax image signal having viewing area information adjusted by the viewing area adjusting device 1 (to be explained later).

The lenticular lens 32 has a plurality of convexes arranged in the horizontal direction of the display panel 31, and the number of convexes is ⅑ of the number of pixels arranged in the horizontal direction of the display panel 31. The lenticular lens 32 is attached to the surface of the display panel 31 so that one convex corresponds to nine pixels. Light transmitted through each pixel has a directivity and is outputted from near the top of the convex toward a specific direction.

The display panel 31 of the present embodiment can display a stereoscopic video based on a multi-parallax scheme (integral imaging scheme) covering three or more parallaxes or on a two-parallax scheme, in addition to a normal two-dimensional video. Display resolution is the same regardless of the type of the display method.

The display controller 4 controls the timing for supplying pixel data to each pixel of the display panel 31. The display panel 31 of the present embodiment can display both of a two-dimensional video and a stereoscopic video. The display controller 4 supplies pixel data for two-dimensional video display to the display panel 31 when the display panel 31 displays a two-dimensional video, and supplies two-parallax data or multi-parallax data to each pixel when the display panel 31 displays a three-dimensional video.

The camera 5 is installed around the center of the lower part of the display panel 31 at a predetermined elevation angle, and shoots a predetermined area in front of the display panel 31. The shot video is supplied to the viewing area adjusting device 1, and used to detect the position of a viewer. The camera 5 may shoot either a moving image or a still image.

The light receiver 6 is arranged on the left side of the lower part of the display panel 31, for example. The light receiver 6 receives an infrared signal transmitted from a remote controller used by the viewer. The infrared signal includes signals showing information as to which one of a stereoscopic video and a two-dimensional video is to be displayed, and which one of a multi-parallax scheme and a two-parallax scheme should be employed and whether the viewing area should be controlled when displaying a stereoscopic video, for example.

The tuner decoder 7 receives and selects an input broadcast wave, and decodes an encoded video signal. Alternatively, the tuner decoder 7 receives an encoded video signal from a video output device such as an optical disk reproducing device, and decodes the received signal. The decoded signal, which is called a baseband video signal, is supplied to the parallax image converter 8.

The parallax image converter 8 converts the baseband video signal into a parallax image signal covering two or more parallaxes to stereoscopically display the video, and supplies the converted signal to an image adjusting unit 15.

The process performed by the parallax image converter 8 differs depending on which one of the multi-parallax scheme and the two-parallax scheme should be employed.

When employing the multi-parallax scheme, the parallax image converter 8 generates first to ninth parallax image signals corresponding to first to ninth parallax images. In this case, when a video signal covering nine parallaxes is inputted, the first to ninth parallax image signals are generated using the video signal. When a two-dimensional video signal or a video signal covering eight or less parallaxes is inputted, the first to ninth parallax image signals are generated by performing motion detection, composition identification, human face detection, etc.

When employing the two-parallax scheme, the parallax image converter 8 generates left-eye and right-eye parallax image signals corresponding to left-eye and right-eye parallax images respectively. When a video signal including parallax information based on a Frame Packing (FP) method, Side By Side (SBS) method, Top And Bottom (TAB) method, etc. is inputted, the parallax image converter 8 generates left-eye and right-eye parallax image signals each having a format displayable by the display panel 31.

On the other hand, when the two-parallax scheme is employed and a two-dimensional video signal not including parallax information is inputted, the parallax image converter 8 generates the left-eye and right-eye parallax image signals based on the depth value of each pixel in the video signal. The depth value is a value showing how far each pixel should be displayed frontward or backward from the display panel 31. The depth value may be previously added to the video signal, or may be generated based on the characteristics of the video signal.

When employing the two-parallax scheme, in the left-eye parallax image, the pixel viewed on the front side should be displayed with being shifted to the right compared to the pixel viewed on the back side. Therefore, the parallax image converter 8 generates the left-eye parallax image signal by performing a process of shifting the pixel viewed on the front side in the video signal to the right. The shift amount is increased as the depth value becomes larger.

As shown in FIG. 2, the viewing area adjusting device 1 has a viewer information detector 11, a viewing area adjustment policy determining unit 12, a viewing area information computing unit 13, and a viewing area adjusting unit 14. The viewing area adjusting device 1 is formed as one IC (Integrated Circuit) for example, and arranged on the back side of the display panel 31. Naturally, at least a part of the viewing area adjusting device 1 may be implemented by software.

The viewer information detector 11 recognizes a viewer using the video shot by the camera 5, and detects the number of viewers and their positions. The position information of the viewer is expressed as a position on the X-axis (horizontal direction), Y-axis (vertical direction), and Z-axis (normal direction of the surface of the display panel 31), using the center of the display panel 31 as the origin, for example. More concretely, first, the viewer information detector 11 recognizes a viewer by detecting a human face in the input video data. Then, the viewer information detector 11 computes the position on the X-axis and the Y-axis based on the position of the face in the video, and computes the position on the Z-axis based on the size of the face. When a plurality of viewers exist, the viewer information detector 11 may detect the positions of a predetermined number of viewers (e.g., ten people). In this case, when the number of detected faces is larger than 10, the positions of ten viewers closest to the display panel 31, namely having smallest distances on the Z-axis, are sequentially detected, for example.

The viewing area adjustment policy determining unit 12 selects any one of a plurality of viewing area adjustment policies each expressing a policy for adjusting a viewing area where the stereoscopic video is viewable, based on the number of viewers detected by the viewer information detector 11.

The viewing area information computing unit 13 computes an adjustment amount for the viewing area, based on the viewing area adjustment policy selected by the viewing area adjustment policy determining unit 12 and on the position of each viewer detected by the viewer information detector 11. The viewing area adjusting unit 14 adjusts the viewing area, based on the adjustment amount for the viewing area computed by the viewing area information computing unit 13.

In the present embodiment, an example will be explained, in which a multi-parallax scheme covering nine parallaxes is employed by arranging nine pixels corresponding to each convex of the display panel 31. In the multi-parallax scheme, the first to ninth parallax images are displayed through nine pixels corresponding to each convex, respectively. The first to ninth parallax images are images observed when a subject is viewed from nine viewpoints arranged in the horizontal direction. The viewer can stereoscopically view the video by viewing one of the first to ninth parallax images with the left eye while viewing another parallax image with the right eye, through the lenticular lens 32. In the multi-parallax scheme, the viewing area can be broadened. The viewing area is an area where the video can be stereoscopically viewed when the display panel 31 is viewed from the position in front thereof.

On the other hand, in the two-parallax scheme, a right-eye parallax image is displayed through four pixels of nine pixels corresponding to each convex, and a left-eye parallax image is displayed through the other five pixels. The left-eye and right-eye parallax images are images observed when a subject is viewed from two viewpoints arranged in the horizontal direction as the left and right viewpoints, respectively. The viewer can stereoscopically view the video by viewing the left-eye parallax image with the left eye while viewing the right-eye parallax image with the right eye, through the lenticular lens 32. In the two-parallax scheme, the video can be displayed more stereoscopically compared to the multi-parallax scheme, but the viewing area is narrower compared to the multi-parallax scheme.

When displaying a two-dimensional image on the display panel 31, the same image is displayed through nine pixels corresponding to each convex. In this way, display resolution in the case of displaying a two-dimensional image on the display panel 31 is the same as display resolution in the case of displaying a stereoscopic video for two parallaxes or multiple parallaxes.

Further, in the present embodiment, the viewing area is adjusted by controlling the relative positional relationship between each convex of the lenticular lens 32 and nine pixels corresponding to each convex. Hereinafter, parallax control based on the multi-parallax scheme will be explained as an example.

Figure 3:
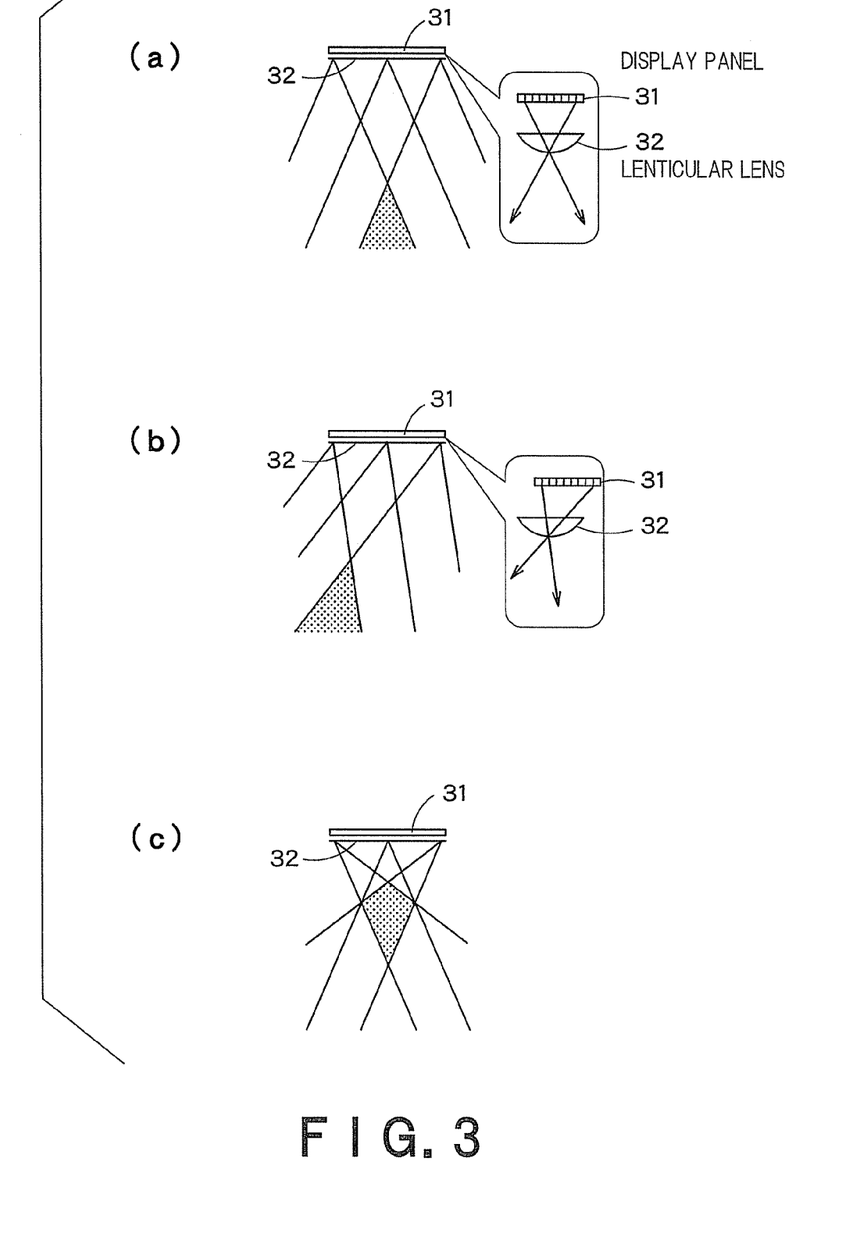
FIG. 3 is a partial top view of a display panel 31 and a lenticular lens 32.

FIG. 3 is a partial top view of the display panel 31 and the lenticular lens 32. In FIG. 3, the shaded area shows the viewing area, and a video can be stereoscopically viewed when the display panel 31 is viewed from the viewing area. In the other areas, pseudoscopic or crosstalk phenomenon is caused, and thus it is difficult to stereoscopically view the video in those areas.

FIG. 3 shows the relative positional relationship between the display panel 31 and the lenticular lens 32, and more concretely, shows the viewing area changes depending on the distance between the display panel 31 and the lenticular lens 32 and the shift amount between the display panel 31 and the lenticular lens 32 in the horizontal direction.

Actually, the lenticular lens 32 is attached with high accurate positioning to the display panel 31, and thus it is difficult to physically change the relative positional relationship between the display panel 31 and the lenticular lens 32.

Accordingly, in the present embodiment, the viewing area is adjusted by shifting the position of the first to ninth parallax images displayed through each pixel of the display panel 31 to change the apparent relative positional relationship between the display panel 31 and the lenticular lens 32.

For example, compared to a case where the first to ninth parallax images are sequentially displayed through nine pixels corresponding to each convex (FIG. 3(a)), the viewing area moves to the left when displaying the whole of the parallax images shifted to the right (FIG. 3(b)). To the contrary, when displaying the whole of the parallax images shifted to the left, the viewing area moves to the right.

Further, when the parallax images around the center in the horizontal direction are not shifted and the parallax images closer to the outer parts of the display panel 31 are largely shifted outwardly (FIG. 3(c)), the viewing area moves to the direction approaching the display panel 31. Note that each pixel between the shifted parallax image and unshifted parallax image or between parallax images having different shift amounts should be properly interpolated depending on its peripheral pixels. Further, contrary to FIG. 3(c), when the parallax images around the center in the horizontal direction are not shifted and the parallax images closer to the outer parts of the display panel 31 are largely shifted inwardly, the viewing area moves to the direction receding from the display panel 31.

In this way, the viewing area can be moved in the right and left directions or in the back and forth directions with respect to the display panel 31 by displaying the parallax images entirely or partially shifted. In FIG. 3, only one viewing area is shown for simple explanation, but a plurality of viewing areas exist in the actual case, and when the positions of the first to ninth parallax images displayed through each pixel of the display panel 31 are shifted, the viewing areas simultaneously move. The movement of the viewing area is controlled the viewing area adjusting unit 14 of FIG. 2.

Figure 4:
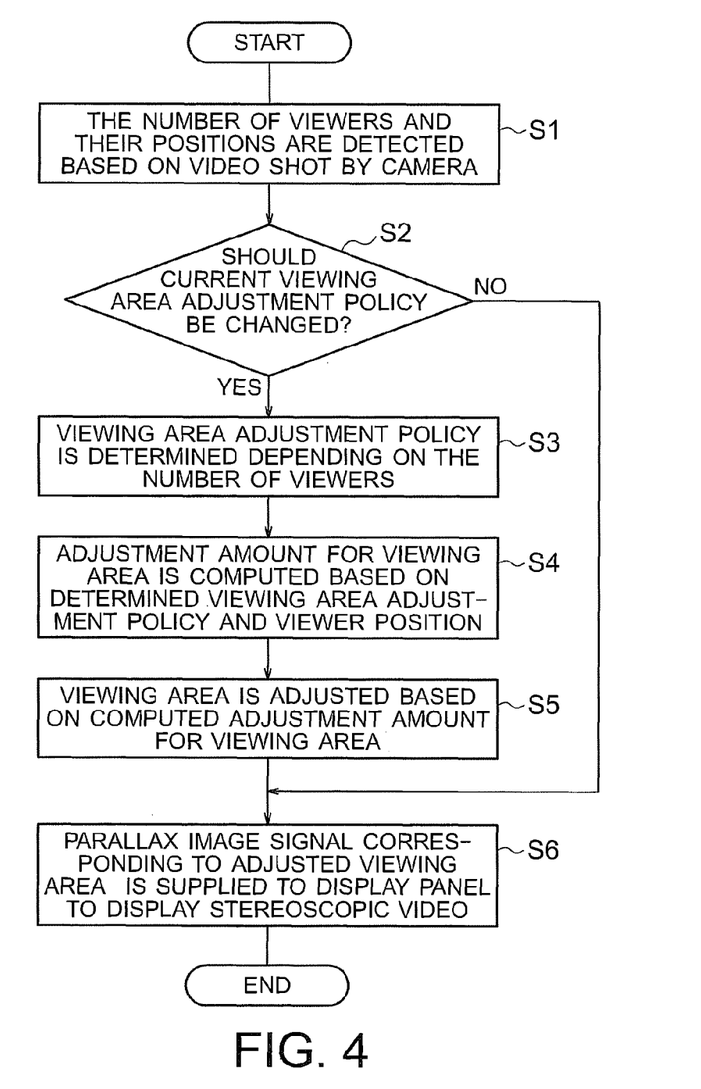
FIG. 4 is a flow chart showing the processing operation performed by the viewing area adjusting device 1 according to the first embodiment.

FIG. 4 is a flow chart showing the processing operation performed by the viewing area adjusting device 1 according to the first embodiment. First, the viewer information detector 11 recognizes a viewer based on the video shot by the camera, and detects the number of recognized viewers and their positions (Step S1).

Next, the viewing area adjustment policy determining unit 12 judges whether the viewing area adjustment policy currently employed should be changed (Step S2). If the number of viewers is the same, it is judged that there is no need to change the viewing area adjustment policy, and if the number of viewers has changed, it is judged that the viewing area adjustment policy should be changed.

When it is judged that the viewing area adjustment policy should be changed, the viewing area adjustment policy determining unit 12 determines a viewing area adjustment policy depending on the number of viewers (Step S3).

Figure 5:
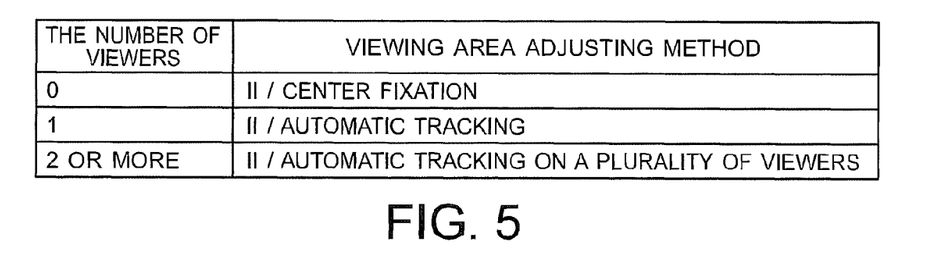
FIG. 5 is a diagram showing a viewing area adjustment policy determining table according to the first embodiment.

FIG. 5 is a diagram showing a viewing area adjustment policy determining table according to the first embodiment. As shown in FIG. 5, the viewing area adjustment policy determining unit 12 according to the first embodiment selects a different viewing area adjustment policy, depending on the number of viewers.

More concretely, when the number of viewers is zero, a center fixation policy is selected to fix the viewing area at the center of the display panel 31. The center fixation is based on the center of an optimum viewing area determined for each display panel 31 having the lenticular lens 32.

Further, when the number of viewers is one, an automatic tracking policy is selected to let the viewing area tracking the position of the viewer automatically and continuously so that the viewer is arranged at the center of the viewing area. Further, when the number of viewers is two or more, an automatic multi-viewer tracking policy is selected to let the viewing area track the position of each viewer automatically.

Regardless of the type of the selected viewing area adjustment policy, the integral imaging scheme is employed to display a multi-parallax stereoscopic video covering three or more parallaxes. In FIG. 5, the integral imaging scheme is represented as II. In the present embodiment, when the integral imaging scheme is selected, a stereoscopic video is displayed based on a multi-parallax scheme covering nine parallaxes.

Here, the reason why the center fixation policy is selected when the number of viewers is zero is that there is no need to adjust the viewing area since no viewer exists.

The reason why the viewing area adjustment policy for letting the viewing area automatically track the position of each viewer is selected when the number of viewers is one or two or more is that each viewer changing his/her position can view the stereoscopic video as much as possible. In order to let the viewing area automatically track the position of each viewer, it is required that the viewing area information computing unit 13 computes an adjustment amount for the viewing area, corresponding to the position of the viewer shot by the camera, and that the viewing area adjusting unit 14 adjusts the viewing area based on the computation result. When adjusting the viewing area, the apparent relative positional relationship between the display panel 31 and the lenticular lens 32 is changed by shifting the pixel positions of the first to ninth parallax images displayed on the display panel 31, as explained in FIG. 5.

When a viewing area adjustment policy is determined in the above Step S3 of FIG. 4, the viewing area information computing unit 13 computes an adjustment amount for the viewing area, based on the determined viewing area adjustment policy and the position of the viewer (Step S4).

Figure 6:
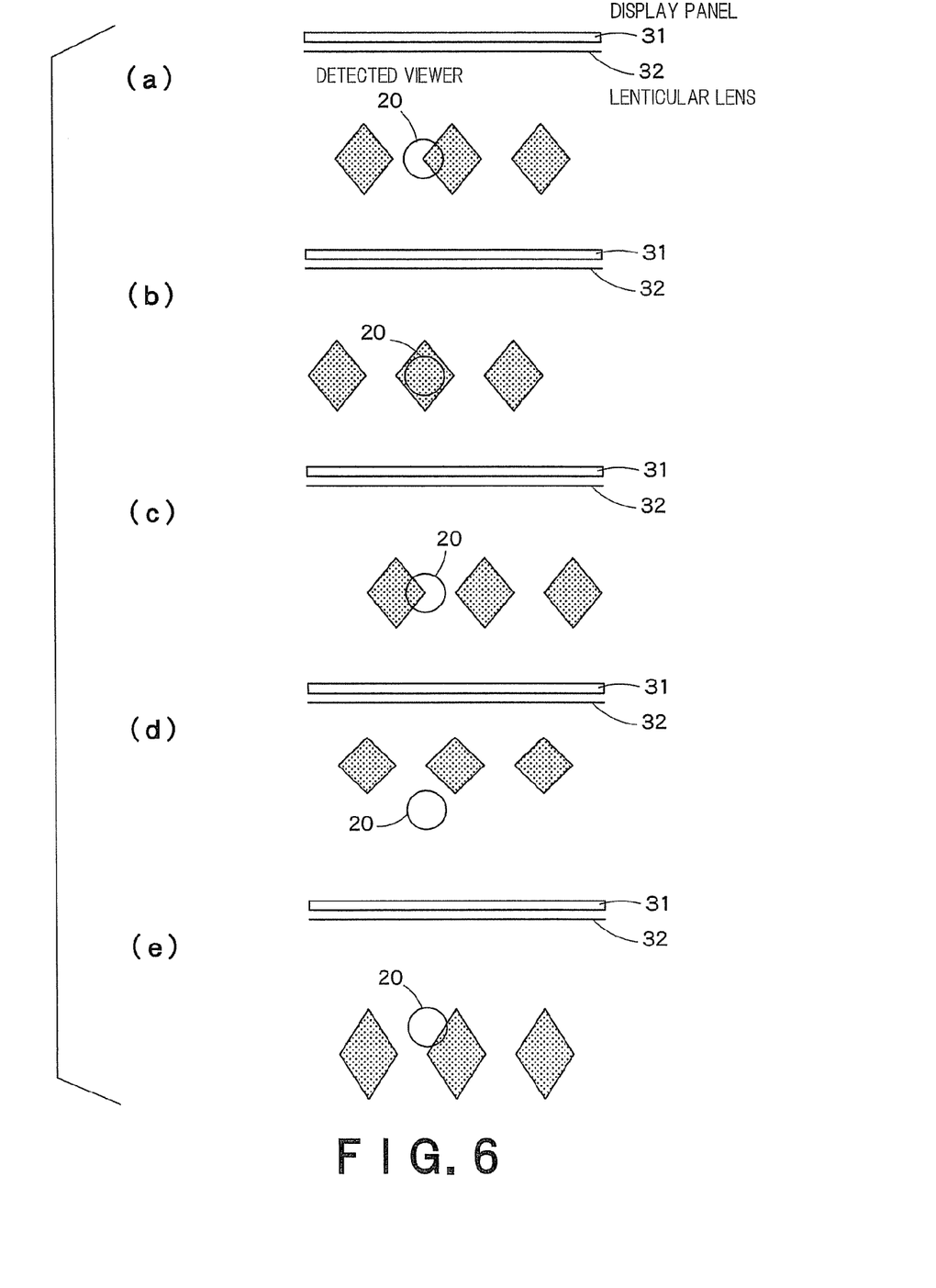
FIG. 6 is a diagram showing an example of a technique for computing an adjustment amount for a viewing area.

FIG. 6 is a diagram showing an example of a technique for computing an adjustment amount for a viewing area. The viewing area information computing unit 13 previously determines some patterns of settable viewing areas. Then, the viewing area information computing unit 13 computes the area size of the overlap between the viewing area and the position of detected viewer, with respect to each viewing area, and judges a viewing area having the maximum area size as an appropriate viewing area. In the example of FIG. 6, five patterns of viewing areas (shaded areas) are previously determined as shown in FIGS. 6(*a*) to 6(*e*). In FIG. 6(*b*), the viewing area is set on the left side with respect to the display panel 31, and the area size of the overlap between the position of a detected viewer 20 and the viewing area is the maximum in the five patterns. Accordingly, the viewing area information computing unit 13 judges the viewing area pattern of FIG. 6(*b*) as an appropriate viewing area, and computes a control parameter for displaying a parallax image with the pattern of FIG. 6(*b*). Here, the control parameter is a shift amount for the pixel position to display the parallax image on the display panel 31, for example.

When an adjustment amount for the viewing area is computed in Step S4 of FIG. 4 as stated above, the viewing area adjusting unit 14 then adjusts the viewing area by shifting the parallax image signal or performing an interpolation process depending on the control parameter computed by the viewing area information computing unit 13, thereby a new parallax image signal being generated (Step S5). Then, this new parallax image signal is supplied to the display panel 31, and a stereoscopic video is displayed with the adjusted viewing area (Step S6).

As stated above, in the first embodiment, the viewing area adjustment policy is selected depending on the number of viewers, and thus an optimum stereoscopic video can be displayed depending on the number of viewers. Further, even when the viewer changes his/her position, the viewing area automatically tracks the position of viewer, and thus the stereoscopic video can be displayed continuously and stably without discomforting the viewer.

(Second Embodiment)

In a second embodiment, not only the number of viewers but also the type of input video is considered when determining a viewing area adjustment policy.

Figure 7:
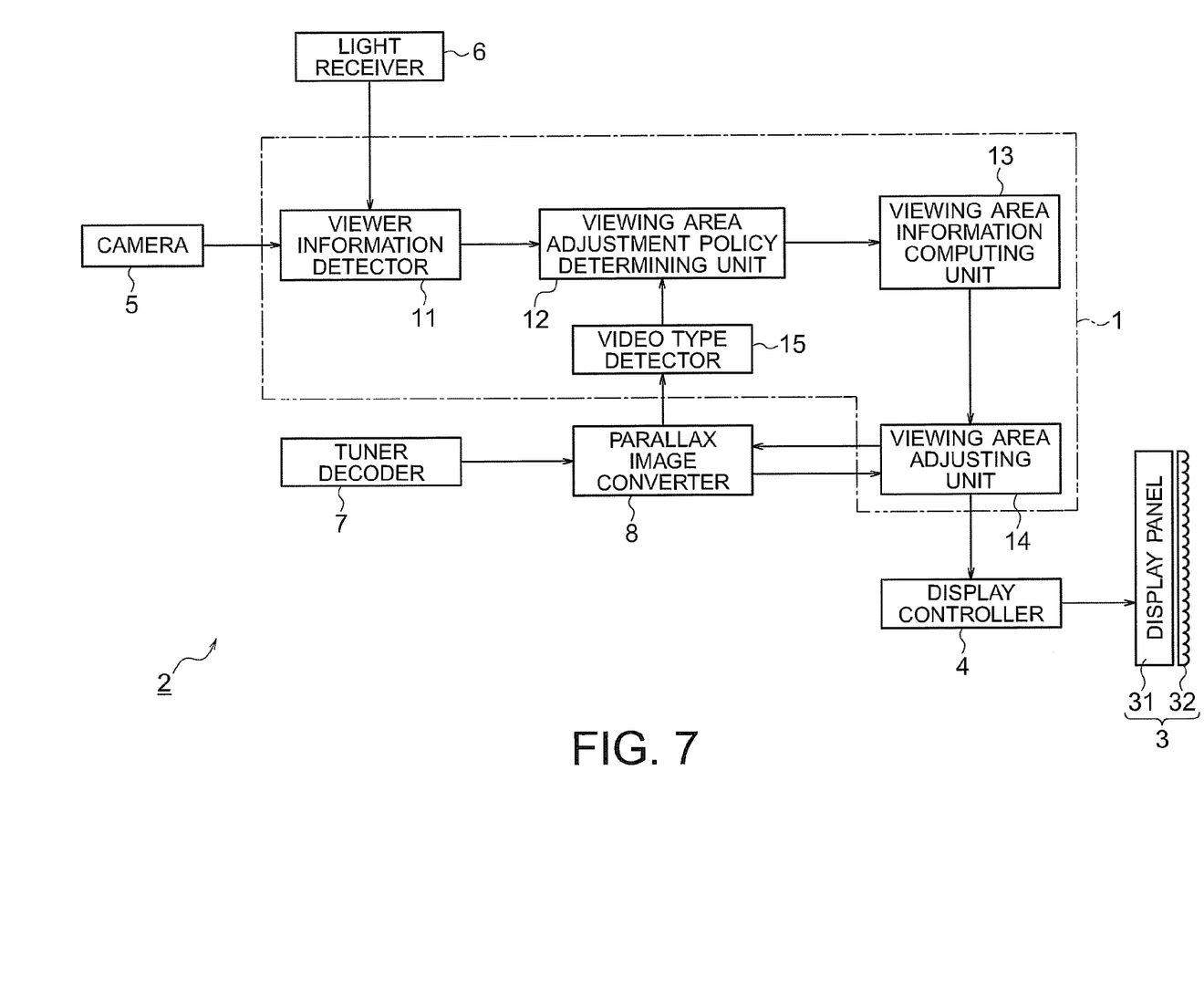
FIG. 7 is a block diagram showing a schematic structure of the video processing device 2 having the viewing area adjusting device 1 according to a second embodiment.

FIG. 7 is a block diagram showing a schematic structure of the video processing device 2 having the viewing area adjusting device 1 according to the second embodiment. The viewing area adjusting device 1 of FIG. 7 has a video type detector 15 in addition to the components of the viewing area adjusting device 1 of FIG. 2.

The video type detector 15 of FIG. 7 detects the video type of input video data. For example, the video type detector 15 detects whether the input video data is video data including depth information or parallax information (hereinafter referred to as stereo 3D data), or normal two-dimensional video data without depth information and parallax information.

The reason why the video type is detected by the video type detector 15 is that input video data provided as stereo 3D data can be stereoscopically displayed with higher quality when displaying the stereoscopic video directly utilizing the stereo 3D data, rather than generating multi-parallax data based on the integral imaging scheme.

Figure 8:
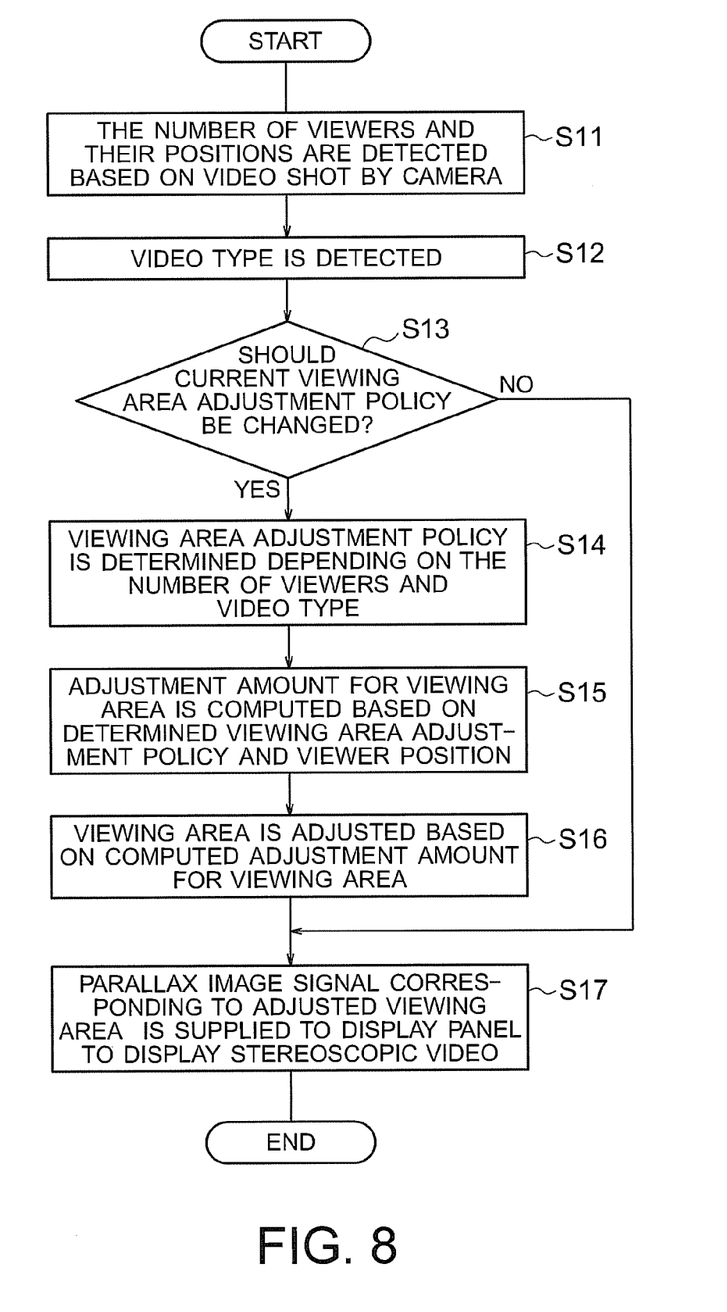
FIG. 8 is a flow chart showing the processing operation performed by the viewing area adjusting device 1 according to the second embodiment.

FIG. 8 is a flow chart showing the processing operation performed by the viewing area adjusting device 1 according to the second embodiment. The flow chart of FIG. 8 is different from the flow chart of FIG. 4 in the processes of Steps S12 and S14. That is, after the viewer information detector 11 detects the number of viewers and their positions (Step S11), the video type detector 15 detects the video type of the input video data (Step S12).

After that, whether the current viewing area adjustment policy should be changed is judged (Step S13), and if judged to be changed, the viewing area adjustment policy determining unit 12 determines a new viewing area adjustment policy (Step S14).

Figure 9:
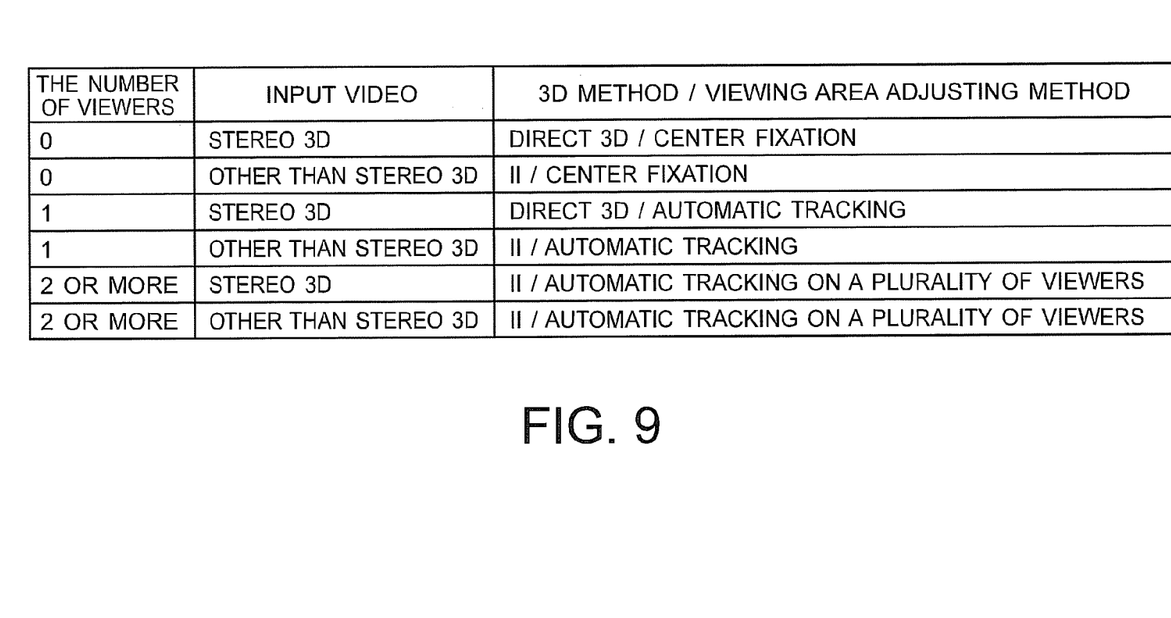
FIG. 9 is a diagram showing a viewing area adjustment policy determining table according to the second embodiment.

FIG. 9 is a diagram showing a viewing area adjustment policy determining table according to the second embodiment. In the table of FIG. 9, two input parameters, namely the number of viewers and the type of input video, are arranged to determine the viewing area adjustment policy. Totally six types of viewing area adjustment policies are provided based on the combination of these two input parameters. Hereinafter, these policies will be explained sequentially.

When the number of viewers is zero and the input video is stereo 3D data, a two-parallax scheme for displaying a stereoscopic video by directly utilizing the depth information or parallax information included in stereo 3D data (hereinafter referred to as direct 3D) is selected as the viewing area adjustment policy, and the viewing area is fixed at the center.

When the number of viewers is zero and the input video is normal two-dimensional video data other than stereo 3D data, displaying a multi-parallax stereoscopic video based on the integral imaging scheme is selected as the viewing area adjustment policy, and the viewing area is fixed at the center.

When the number of viewers is one and the input video data is stereo 3D data, the direct 3D is selected, and the viewing area automatically tracks the position of the viewer.

When the number of viewers is one and the input video data is normal two-dimensional video data other than stereo 3D data, displaying a multi-parallax stereoscopic video based on the integral imaging scheme is selected, and the viewing area automatically tracks the position of the viewer.

When the number of viewers is two or more and the input video data is stereo 3D data, displaying a multi-parallax stereoscopic video based on the integral imaging scheme is selected, and the viewing area automatically tracks the position of each of a plurality of viewers.

When the number of viewers is two or more and the input video data is normal two-dimensional video data other than stereo 3D data, displaying a multi-parallax stereoscopic video based on the integral imaging scheme is selected, and the viewing area automatically tracks the position of each of a plurality of viewers.

As stated above, when the input video data is stereo 3D data and the number of viewers is one or zero, a stereoscopic video is displayed based not on the multi-parallax scheme but on the two-parallax scheme to obtain higher stereoscopic quality, by directly utilizing the depth information or parallax information included in the input video data.

After a viewing area adjustment policy is determined in Step S14 of FIG. 8, an adjustment amount for the viewing area is calculated (Step S15), the viewing area is adjusted (Step S16), and a stereoscopic video is displayed (Step S17), similarly to Steps S4 to S6 in FIG. 4.

As stated above, in the second embodiment, not only the number of viewers but also the type of input video data is considered when determining a viewing area adjustment policy. Thus, when the input video data is stereo 3D data and the number of viewers is one or zero, a two-parallax stereoscopic video can be displayed with higher stereoscopic quality by directly utilizing the input video data.

(Third Embodiment)

In a third embodiment, preference of a user is considered in addition to the elements in the second embodiment when determining a viewing area adjustment policy.

Figure 10:
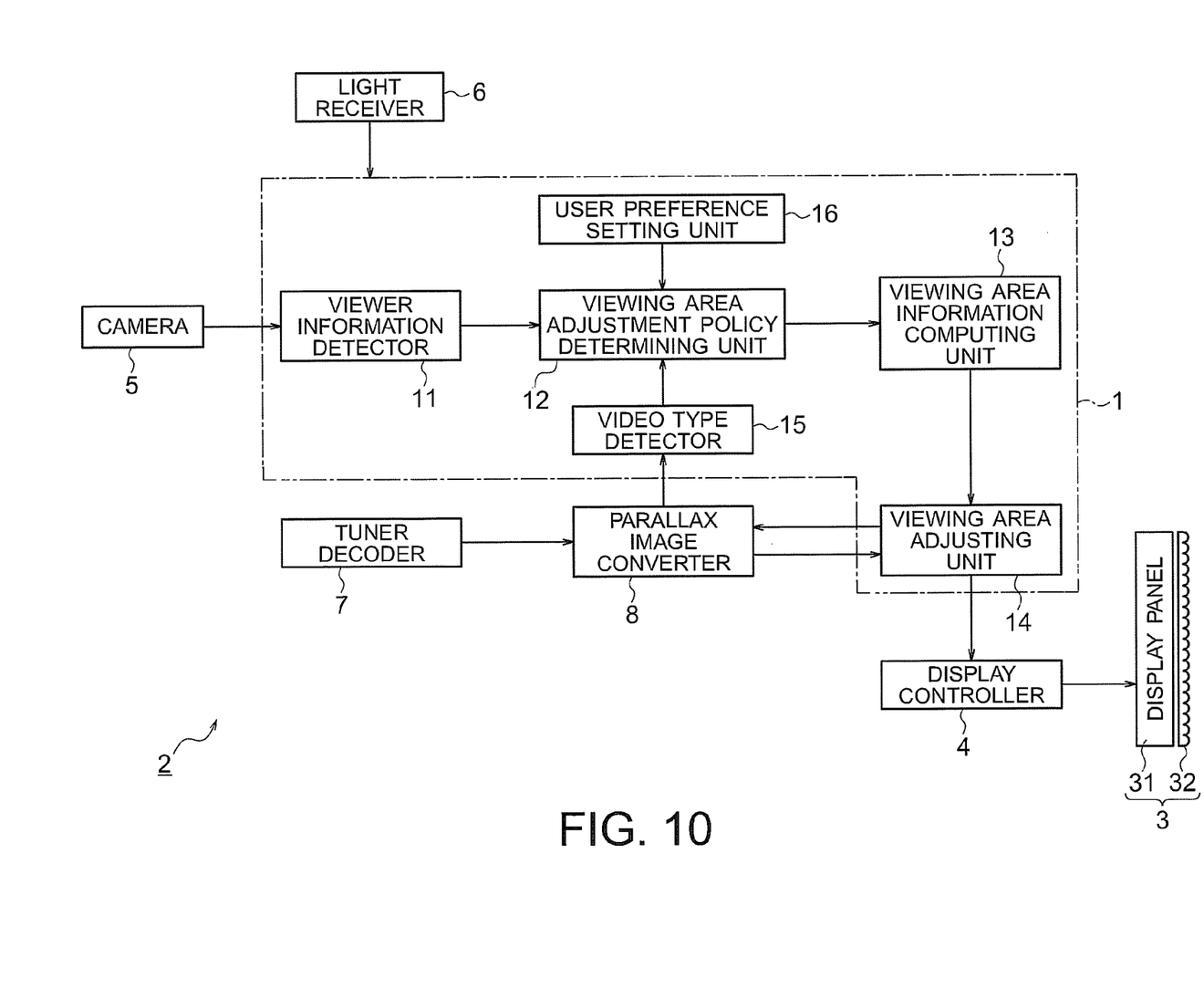
FIG. 10 is a block diagram showing a schematic structure of the video processing device 2 having the viewing area adjusting device 1 according to a third embodiment.

FIG. 10 is a block diagram showing a schematic structure of the video processing device 2 having the viewing area adjusting device 1 according to the third embodiment. The viewing area adjusting device 1 of FIG. 10 has a user preference setting unit 16 in addition to the components of the viewing area adjusting device 1 of FIG. 7.

The user preference setting unit 16 of FIG. 10 sets a viewing area adjustment policy desired by a user. The user selects a viewing area adjustment policy he/she desires from a plurality of viewing area adjustment policies, by using a remote controller etc. The user preference setting unit 16 employs the viewing area adjustment policy selected by the user as needed, based on viewing area adjustment policy determining table to be explained later.

Figure 11:
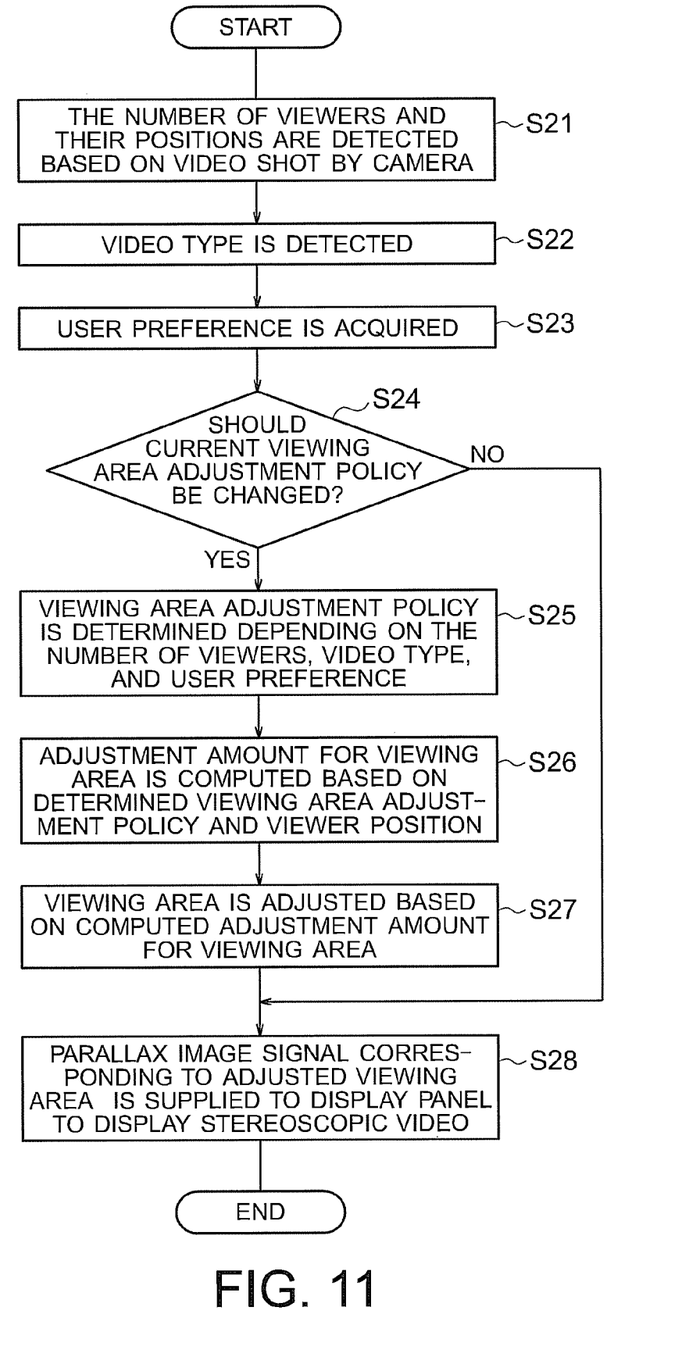
FIG. 11 is a flow chart showing the processing operation performed by the viewing area adjusting device 1 according to the third embodiment.

FIG. 11 is a flow chart showing the processing operation performed by the viewing area adjusting device 1 according to the third embodiment. The flow chart of FIG. 11 is different from the flow chart of FIG. 8 in the processes of Steps S23 and S25. Steps of S21, S26, S27, and S 28 in FIG. 11 are the same as steps S11, S15, S16, and S17 in FIG. 8, respectively. After the video type of the input video data is judged in Step S22, the user preference setting unit 16 sets a viewing area adjustment policy desired by the user (Step S23).

After that, when it is judged that the viewing area adjustment policy should be changed in Step S24, the viewing area adjustment policy determining unit 12 determines a new viewing area adjustment policy considering the preference of the user additionally (Step S24).

Figure 12:
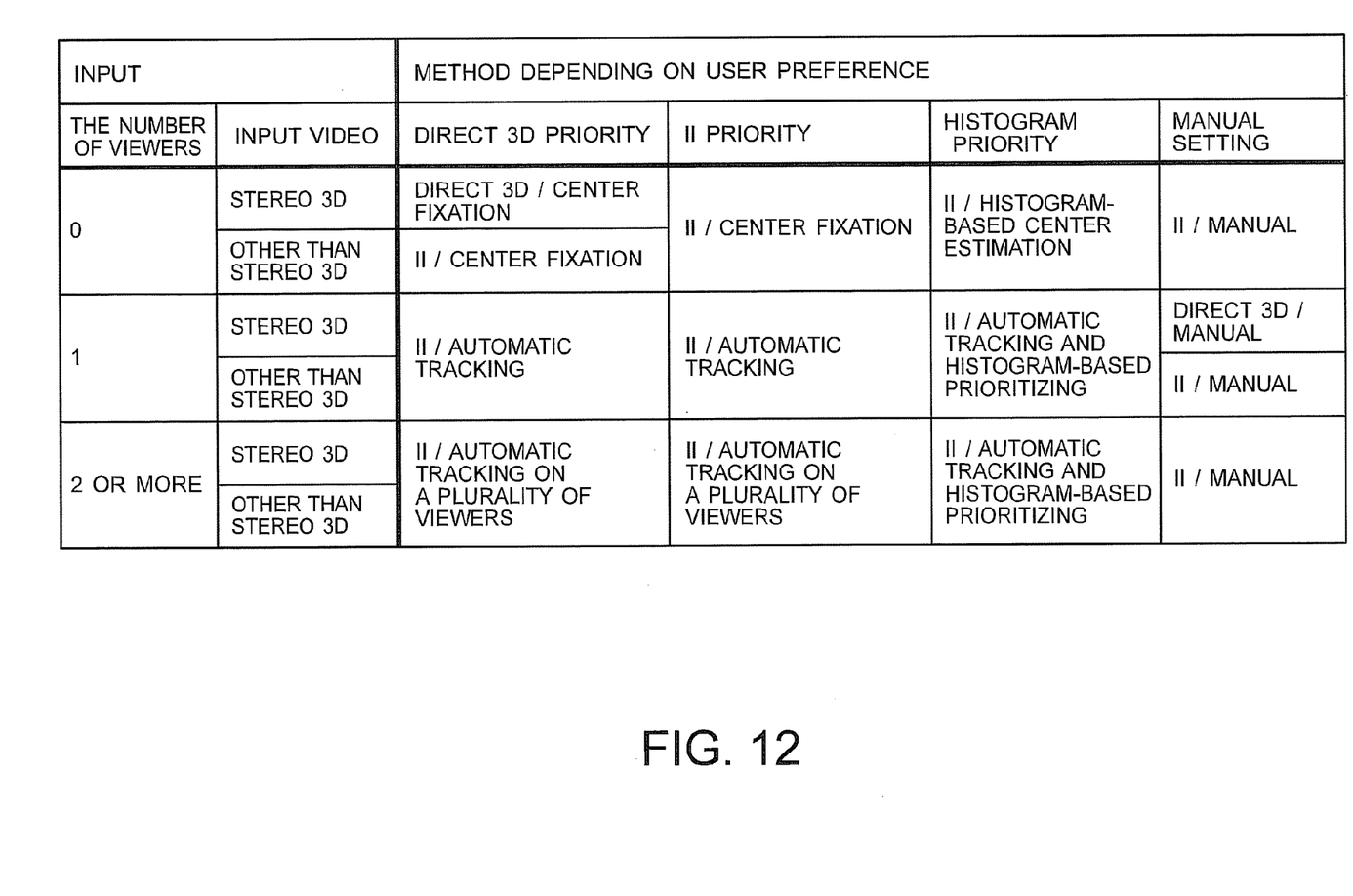
FIG. 12 is a diagram showing a viewing area adjustment policy determining table according to the third embodiment.

FIG. 12 is a diagram showing a viewing area adjustment policy determining table according to the third embodiment. Input parameters used to determine a specific viewing area adjustment policy are the number of viewers, the video type of the input video data, and the user preference set by the user preference setting unit 16.

Concrete information of the user preference is not particularly limited. In the example of FIG. 12, the user can set, through the user preference setting unit 16, whether or not to prioritize direct 3D to display a stereoscopic video directly using the depth information or parallax information included in the input video, whether or not to prioritize the integral imaging scheme to display a multi-parallax stereoscopic video, whether or not to employ a histogram priority method to set the viewing area in a highly weighted position previously set, namely a position with a high priority, and whether or not to employ manual setting arbitrarily performed by the user.

In the example of FIG. 12, when the number of viewers is zero and the input video data is stereo 3D data, the viewing area adjustment policy is determined as follows, depending on the settings of the user preference setting unit 16.

When the user selects direct 3D priority, direct 3D with center fixation is determined. When the user selects integral imaging scheme priority, integral imaging scheme with center fixation is determined. When the user selects histogram priority, integral imaging scheme with histogram-based center estimation is determined. When the user selects manual setting, integral imaging scheme with the viewing area adjustment policy manually determined by the user is permitted.

When the number of viewers is zero and the input video data is normal two-dimensional video data other than stereo 3D data, integral imaging scheme is set even when the user selects direct 3D priority.

When the number of viewers is one, if the user selects the direct 3D priority or integral imaging scheme, integral imaging scheme with automatic tracking is set regardless of the type of input video data. Further, when the user selects histogram priority, integral imaging scheme with histogram-based prioritizing is set. When the user selects manual setting, if the input video data is stereo 3D data, direct 3D with the viewing area adjustment policy manually determined by the user is permitted. When the user selects manual setting, if the input video data is normal two-dimensional video data other than stereo 3D, integral imaging scheme with the viewing area adjustment policy manually determined by the user is permitted.

When the number of viewers is two or more, if the user selects direct 3D priority or integral imaging scheme, integral imaging scheme with automatic tracking on a plurality of viewers is set, regardless of the type of the input video data. When the user selects histogram priority, integral imaging scheme with histogram-based prioritizing is set. When the user selects manual setting, the user is permitted to manually determine the viewing area adjustment policy.

When integral imaging scheme is selected as the viewing area adjustment policy in accordance with FIG. 12, multi-parallax data is generated by detecting depth information by performing motion detection, composition identification, and human face detection on the input video data, even when the input video data is stereo 3D data or normal two-dimensional video data other than stereo 3D data.

As stated above, in the third embodiment, the viewing area adjustment policy is determined further considering user preference, and thus the viewing area can be adjusted satisfying the desire of each user.

At least a part of the viewing area adjusting device 1 and video processing device 2 explained in the above embodiments may be implemented by hardware or software. In the case of software, a program realizing at least a partial function of the viewing area adjusting device 1 and video processing device 2 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the viewing area adjusting device 1 and video processing device 2 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A viewing area adjustment device, comprising:
    an image pickup unit capable of shooting a forward direction of a stereoscopic video display device capable of displaying a stereoscopic video;
    a viewer information detector configured to detect the number of viewers and positions of the viewers by a video shot by the image pickup unit;
    a viewing area adjustment policy determining unit configured to select any one of a plurality of viewing area adjustment policies each showing a policy for adjusting a viewing area where the stereoscopic video is viewable, based on the number of viewers detected by the viewer information detector;
    a viewing area information computing unit configured to compute an adjustment amount for the viewing area, based on the viewing area adjustment policy determining unit and on the position of each viewer detected by the viewer information detector;
    a viewing area adjusting unit configured to adjust the viewing area, based on the adjustment amount for the viewing area computed by the viewing area information computing unit;
    a video type detector configured to detect a video type of input video data, wherein
        the video type detector detects, as the video type, whether the input video data is three-dimensional video data including parallax information or depth information, or two-dimensional video data not including the parallax information and the depth information, and
        when the number of viewers detected by the viewer information detector is one or less and the video type detector detects the three-dimensional video data, the viewing area adjustment policy determining unit selects a viewing area adjustment policy for displaying the stereoscopic video by supplying, to each pixel of the stereoscopic video display device, two-parallax data generated using the parallax information or the depth information included in the input video data, while when the number of viewers detected by the viewer information detector is two or more, the viewing area adjustment policy determining unit selects a viewing area adjustment policy for displaying the stereoscopic video by supplying multi-parallax data of three or more parallaxes to each pixel of the stereoscopic video display device regardless of whether the input video data is the three-dimensional video data or the two-dimensional video data.

2. The viewing area adjusting device of claim 1,
    wherein the viewing area adjustment policies include a center fixation policy configured for fixing the viewing area at a center of an optimum viewing area of the stereoscopic video display device, an automatic tracking policy for adjusting the viewing area in accordance with the position of one viewer as he/she moves, and an automatic multi-viewer tracking policy for adjusting the viewing area in accordance with the position of each of a plurality of viewers as he/she moves, and
    the viewing area adjustment policy determining unit selects the center fixation policy when the number of viewers detected by the viewer information detector is zero, selects the automatic tracking policy when the number of viewers detected by the viewer information detector is one, and selects the automatic multi-viewer tracking policy when the number of viewers detected by the viewer information detector is two or more.

3. The viewing area adjusting device of claim 1, further comprising:
    a user preference setting unit configured to set a viewing area adjustment policy desired by the viewer,
    wherein the viewing area adjustment policy determining unit selects any one of the viewing area adjustment policies based on the number of viewers, the video type, and preference of the viewer set by the user preference setting unit.

4. The viewing area adjusting device of claim 3,
    wherein the user preference setting unit can set any one of: prioritizing a viewing area adjustment policy for displaying the stereoscopic video by supplying, to each pixel of the stereoscopic video display device, two-parallax data generated using parallax information or depth information included in the input video data; prioritizing a viewing area adjustment policy for displaying the stereoscopic video by supplying multi-parallax data of three or more parallaxes to each pixel of the stereoscopic video display device; prioritizing a viewing area adjustment policy for prioritizing histogram to prioritize weight of a predetermined viewing area; and prioritizing a viewing area adjustment policy for prioritizing manual setting by a user, and
    the viewing area adjustment policy determining unit selects any one of the viewing area adjustment policies based on the setting of the user preference setting unit.

5. A video processing device, comprising:
    a decoding processor configured to generate the input video data by decoding an encoded video signal received or recorded;

a display controller configured to control a timing for supplying the input video data to each pixel of the stereoscopic video display device, in order to obtain the viewing area adjusted by the viewing area adjusting unit; and a viewing area adjusting device, the viewing area adjusting device having:

an image pickup unit capable of shooting a forward direction of a stereoscopic video display device capable of displaying a stereoscopic video;

a viewer information detector configured to detect a number of viewers and positions of the viewers by a video shot by the image pickup unit;

a viewing area adjustment policy determining unit configured to select any one of a plurality of viewing area adjustment policies each showing a policy for adjusting a viewing area where the stereoscopic video is viewable, based on the number of viewers detected by the viewer information detector;

a viewing area information computing unit configured to compute an adjustment amount for the viewing area, based on the viewing area adjustment policy selected by the viewing area adjustment policy determining unit and on the position of each viewer detected by the viewer information detector;

a viewing area adjusting unit configured to adjust the viewing area, based on the adjustment amount for the viewing area computed by the viewing area information computing unit;

a video type detector configured to detect a video type of input video data, wherein the video type detector detects, as the video type, whether the input video data is three-dimensional video data including parallax information or depth information, or two-dimensional video data not including the parallax information and the depth information, and when the number of viewers detected by the viewer information detector is one or less and the video type detector detects the three-dimensional video data, the viewing area adjustment policy determining unit selects a viewing area adjustment policy for displaying the stereoscopic video by supplying, to each pixel of the stereoscopic video display device, two-parallax data generated using the parallax information or the depth information included in the input video data, while when the number of viewers detected by the viewer information detector is two or more, the viewing area adjustment policy determining unit selects a viewing area adjustment policy for displaying the stereoscopic video by supplying multi-parallax data of three or more parallaxes to each pixel of the stereoscopic video display device regardless of whether the input video data is the three-dimensional video data or the two-dimensional video data.

6. The video processing device of claim 5, wherein the stereoscopic video display device has:

a flat display comprising a plurality of pixels arranged in a matrix, and a light ray controller configured to have a plurality of exit pupils arranged to face the flat display to control light rays from each pixel of the flat display.

7. The video processing device of claim 5, wherein the viewing area adjustment policies include a center fixation policy for fixing the viewing area at a center of an optimum viewing area of the stereoscopic video display device, an automatic tracking policy for adjusting the viewing area in accordance with the position of one viewer as he/she moves, and an automatic multi-viewer tracking policy for adjusting the viewing area in accordance with the position of each of a plurality of viewers as he/she moves, and the viewing area adjustment policy determining unit selects the center fixation policy when the number of viewers detected by the viewer information detector is zero, selects the automatic tracking policy when the number of viewers detected by the viewer information detector is one, and selects the automatic multi-viewer tracking policy when the number of viewers detected by the viewer information detector is two or more.

8. The video processing device of claim 5, further comprising:

a user preference setting unit configured to set a viewing area adjustment policy desired by the viewer, wherein the viewing area adjustment policy determining unit selects any one of the viewing area adjustment policies based on the number of viewers, the video type, and preference of the viewer set by the user preference setting unit.

9. The video processing device of claim 8, wherein the user preference setting unit can set any one of: prioritizing a viewing area adjustment policy for displaying the stereoscopic video by supplying, to each pixel of the stereoscopic video display device, two-parallax data generated using parallax information or depth information included in the input video data; prioritizing a viewing area adjustment policy for displaying the stereoscopic video by supplying multi-parallax data of three or more parallaxes to each pixel of the stereoscopic video display unit; prioritizing a viewing area adjustment policy for prioritizing histogram to prioritize weight of a predetermined viewing area; and prioritizing a viewing area adjustment policy for prioritizing manual setting by a user, and the viewing area adjustment policy determining unit selects any one of the viewing area adjustment policies based on the setting of the user preference setting unit.

10. A viewing area adjusting method, comprising:

shooting a forward direction of a stereoscopic video display device capable of displaying stereoscopic video;

detecting the number of viewers and positions by the video shot;

selecting any one of a plurality of viewing area adjustment policies each showing a policy for adjusting a viewing area where the stereoscopic video is viewable, based on the number of viewers detected;

computing an adjustment value for the viewing area, based on the selected viewing area adjustment policy and the detected position of each viewer;

adjusting the viewing area, based on the computed adjustment value for the viewing area;

detecting a video type of input video data, wherein the detecting of the video detects, as the video type, whether the input video data is three-dimensional video data including parallax information or depth information, or two-dimensional video data not including the parallax information and the depth information, and when the detected number of viewers is one or less and the detecting of the video type detects the three-dimensional video data, the adjusting of the viewing area selects a viewing area adjustment policy for displaying the stereoscopic video by supplying, to each pixel of the stereoscopic video display device, two-parallax data generated using the parallax information or the depth information included in the input video data, while when the detected number of viewers is two or more, the selecting of the viewing area adjustment policy selects a viewing area adjustment policy for displaying the stereoscopic video by supplying multi-parallax data of three or more parallaxes to each pixel of the stereoscopic video display device regardless of whether the input video data is the three-dimensional video data or the two-dimensional video data.

11. The viewing area adjusting method of claim 10, wherein the viewing area adjustment policies include a center fixation policy for fixing the viewing area at a center of an optimum viewing area of the stereoscopic video display device, an automatic tracking policy for adjusting the viewing area in accordance with the position of one viewer as he/she moves, and an automatic multi-viewer tracking policy for adjusting the viewing area in accordance with the position of each of a plurality of viewers as he/she moves, and the selecting any one of a plurality of viewing area adjustment policies selects the center fixation policy when the number of viewers detected by the viewer information detector is zero, selects the automatic tracking policy when the number of viewers detected by the viewer information detector is one, and selects the automatic multi-viewer tracking policy when the number of viewers detected by the viewer information detector is two or more.

\* \* \* \* \*